United States Patent
Wang et al.

(10) Patent No.: US 12,367,273 B2
(45) Date of Patent: Jul. 22, 2025

(54) DEVICE REGISTRATION METHODS AND APPARATUSES, ELECTRONIC DEVICES AND STORAGE MEDIA

(71) Applicant: BOE Technology Group Co., Ltd., Beijing (CN)

(72) Inventors: Tongbo Wang, Beijing (CN); Xiaoran Sun, Beijing (CN); Jiao Huang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/767,751

(22) PCT Filed: May 27, 2021

(86) PCT No.: PCT/CN2021/096486
§ 371 (c)(1),
(2) Date: Apr. 8, 2022

(87) PCT Pub. No.: WO2022/246753
PCT Pub. Date: Dec. 1, 2022

(65) Prior Publication Data
US 2024/0104185 A1    Mar. 28, 2024

(51) Int. Cl.
G06F 21/44       (2013.01)
H04L 9/40        (2022.01)
H04L 67/303      (2022.01)

(52) U.S. Cl.
CPC .......... *G06F 21/44* (2013.01); *H04L 63/0876* (2013.01); *H04L 67/303* (2013.01)

(58) Field of Classification Search
CPC .... G06F 21/44; H04L 63/0876; H04L 67/303
See application file for complete search history.

(56) References Cited

U.S. PATENT DOCUMENTS

| | | | |
|---|---|---|---|
| 7,620,008 B1 | 11/2009 | Hayes et al. | |
| 2013/0030826 A1 | 1/2013 | Blom | |
| 2014/0095391 A1* | 4/2014 | Coughlin | H04L 63/08 726/4 |
| 2016/0050239 A1* | 2/2016 | Amber | H04L 69/08 709/220 |

(Continued)

FOREIGN PATENT DOCUMENTS

| | | |
|---|---|---|
| CN | 101547444 A | 9/2009 |
| CN | 103597868 A | 2/2014 |

(Continued)

OTHER PUBLICATIONS

Shao Weixiang et al, Device configuration, ZTE Corporation, 3GPP TSG-SA WG6 Meeting #37-e, E-meeting, May 11 May 21, 2020, S6-200702.

(Continued)

*Primary Examiner* — Junior O Mendoza
(74) *Attorney, Agent, or Firm* — IPro, PLLC (57) ABSTRACT

The present disclosure pertains to device registration method and apparatus, an electronic device and a storage medium. The method includes: detecting device information of a device accessing a terminal; generating a serial number of the device according to the device information; sending the serial number to a server such that the server completes registration for the device according to the serial number.

20 Claims, 2 Drawing Sheets

(56) References Cited

U.S. PATENT DOCUMENTS

| | | | |
|---|---|---|---|
| 2018/0322563 A1 | 11/2018 | Wan | |
| 2020/0327219 A1* | 10/2020 | Bolimovsky | H04W 12/68 |
| 2022/0229755 A1* | 7/2022 | Ramtekkar | G06F 11/008 |
| 2022/0300962 A1* | 9/2022 | Zia | G06Q 20/326 |
| 2022/0330357 A1* | 10/2022 | Jeong | H04M 15/61 |

FOREIGN PATENT DOCUMENTS

| | | | |
|---|---|---|---|
| CN | 103701757 A | 4/2014 | |
| CN | 104967994 A | 10/2015 | |
| CN | 105094343 A | 11/2015 | |
| CN | 105931165 A | 9/2016 | |
| CN | 105978873 A | 9/2016 | |
| CN | 106713518 A | 5/2017 | |
| CN | 106936835 A | 7/2017 | |
| CN | 107645548 A | 1/2018 | |
| CN | 109962895 A | 7/2019 | |
| CN | 110377856 A | 10/2019 | |
| CN | 111193817 A | 5/2020 | |
| CN | 112004226 A | 11/2020 | |
| CN | 112287329 A | 1/2021 | |
| CN | 112448930 A | 3/2021 | |
| CN | 112583799 A | 3/2021 | |

OTHER PUBLICATIONS

PCT/CN2021/096486 international search report.
CN2021800013813 first office action dated Mar. 28, 2024.
PCT/CN2021/096486 Written Opinion dated Nov. 19, 2021.

\* cited by examiner

DEVICE REGISTRATION METHODS AND APPARATUSES, ELECTRONIC DEVICES AND STORAGE MEDIA

CROSS-REFERENCE TO RELATED APPLICATIONS

The present application is a U.S. National Phase of International Application Serial No. PCT/CN2021/096486 filed on May 27, 2021. The entire content of the above-referenced application is incorporated herein by reference.

TECHNICAL FIELD

The present disclosure relates to the field of device registration technologies, and in particular to device registration methods and apparatuses, electronic devices and storage media.

BACKGROUND

Along with progress of scientific technologies and increasing awareness of people for health, more and more detection platforms such as healthhouses appear. A work station is disposed in the healthhouse and a detection device for detecting human body health information is connected in the work station. Health data detected in the healthhouse needs to be uploaded to a backstage server for storing and processing. In the related arts, only when device information of the healthhouse is imported or input into a backstage server in advance can the server receive, process and store the data generated by these devices, which is very inconvenient and can easily lead to failure to process the data normally or even data loss.

SUMMARY

The present disclosure provides device registration methods and apparatuses, an electronic device and a storage medium.

According to some embodiments of the present disclosure, there is provided a device registration method applied to a terminal in a workroom. The method includes:
  detecting device information of a device accessing a terminal;
  generating a serial number of the device according to the device information;
  sending the serial number to a server such that the server completes registration for the device according to the serial number.

In some embodiments, detecting the device information of the device accessing the terminal includes:
  detecting the device accessing the terminal by using a software development kit disposed in the terminal to obtain the device information of the device.

In some embodiments, the terminal pre-stores a configuration file, the configuration file includes the device information of each device to access the terminal, and the device information includes a device model and at least one piece of device attribute information;
  detecting the device information of the device accessing the terminal includes:
    detecting the device accessing the terminal by using the software development kit disposed in the terminal to obtain the device model of the device;
    obtaining the at least one piece of device attribute information corresponding to the device model from the configuration file according to the device model.

In some embodiments, the device attribute information includes at least one of a type identifier, a device type, a name, a vendor, and a serial port address.

In some embodiments, the terminal pre-stores a configuration file, and the configuration file includes device information of each device to access the terminal and a serial port scan command;
  detecting the device information of the device accessing the terminal includes:
    obtaining a matched device and device information of the device by comparing the device information in the configuration file with the device;
    confirming whether the matched device is connected based on the serial port scan command in the configuration file;
    when it is confirmed that the matched device is connected, determining the device information of the matched device as the device information of the device accessing the terminal.

In some embodiments, the device information includes at least one of a device type, a type identifier, a device model, a name, a vendor, and a serial port address.

In some embodiments, the method further includes:
  adding, deleting or updating the device information of at least one device in the configuration file.

In some embodiments, generating the serial number of the device according to the device information includes:
  obtaining at least one piece of information from the device information;
  generating the serial number of the device according to the at least one piece of information and a preset format of the serial number.

In an embodiment, the method further includes:
  obtaining a terminal identifier, and generating the serial number of the device according to the terminal identifier, the at least one piece of information and the preset format of the serial number.

In an embodiment, the method further includes:
  obtaining a workroom identifier and a terminal identifier, and generating the serial number of the device according to the workroom identifier, the terminal identifier, the at least one piece of information and the preset format of the serial number.

In some embodiments, the serial number includes a terminal identifier and a device model.

In some embodiments, the method further includes:
  sending at least one of a workroom identifier, a device type, a type identifier, a name, a vendor and a serial port address to the server at the time of sending the serial number to the server, such that the server completes registration for the device.

In some embodiments, after sending the serial number to the server such that the server completes registration for the device according to the serial number, the method further includes:
  receiving data generated by the registered device, and sending the data to the server such that the server processes and/or stores the data.

In some embodiments, the terminal is a terminal disposed in a healthhouse, and the workroom identifier is an identifier of the healthhouse.

According to some embodiments of the present disclosure, there is provided a device registration method, including:

receiving a serial number of a device from a terminal, where the serial number is generated by the terminal and includes a workroom identifier, a terminal identifier and device information, and the device information includes a type identifier and a device model;

completing registration for the device according to the serial number of the device.

In some embodiments, the method further includes:

receiving at least one of a workroom identifier, a device type, a type identifier, a name, a vendor and a serial port address from the terminal.

In some embodiments, completing registration for the device according to the serial number of the device includes:

verifying legitimacy of the workroom based on the workroom identifier, and verifying legitimacy of the device based on the device information;

in response to that the workroom is legitimate and the device is legitimate, binding the device and the workroom, and marking the device as a registered device.

According to some embodiments of the present disclosure, there is provided a device registration apparatus, including:

a detecting module, configured to detect device information of a device accessing a terminal;

a generating module, configured to generate a serial number of the device according to the device information;

a first registering module, configured to send the serial number to a server such that the server completes registration for the device according to the serial number.

According to some embodiments of the present disclosure, there is provided a device registration apparatus, including:

a receiving module, configured to receive a serial number of a device from a terminal, where the serial number is generated by the terminal and includes a workroom identifier, a terminal identifier and device information, and the device information includes a type identifier and a device model;

a second registering module, configured to complete registration for the device according to the serial number of the device.

According to some embodiments of the present disclosure, there is provided an electronic device. The device includes a memory and a processor. The memory is configured to store computer instructions that can be executable on the processor and the processor is configured to implement the device registration method according to some embodiments of the present disclosure when executing the computer instructions.

According to some embodiments of the present disclosure, there is provided a computer readable storage medium storing computer programs thereon. The programs are executed by a processor to implement the method according to some embodiments of the present disclosure.

It should be understood that the above general descriptions and subsequent detailed descriptions are merely illustrative and explanatory rather than limiting of the present disclosure.

BRIEF DESCRIPTION OF THE DRAWINGS

The accompanying drawings, which are incorporated in and constitute a part of the present description, illustrate embodiments consistent with the present disclosure and serve to explain the principles of the present disclosure together with the description.

DETAILED DESCRIPTION OF THE EMBODIMENTS

Exemplary embodiments will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the embodiments of the present disclosure are for the purpose of describing particular embodiments only, and are not intended to limit the present disclosure. Terms "a", "the" and "said" in their singular forms in the present disclosure and the appended claims are also intended to include plurality, unless clearly indicated otherwise in the context. It should also be understood that the term "and/or" as used herein refers to and includes any or all possible combinations of one or more of the associated listed items.

It is to be understood that, although the terms "first," "second," "third," and the like may be used in the present disclosure to describe various information, such information should not be limited to these terms. These terms are only used to distinguish the same type of information from each other. For example, without departing from the scope of the present disclosure, the first information may also be referred to as the second information and similarly, the second information may also be referred to as the first information. Depending on the context, the word "if" as used herein may be interpreted as "when" or "as" or "determining in response to".

Detection devices cannot perform network connection. To manage these devices, these devices are usually firstly imported through electronic sheets or input by code scanning to a backstage server to enable these devices to become legitimate and valid in the backstage server such that data can be normally sent to the backstage server through other medium during use of the devices. If these devices are not input to the backstage server, data generated by these devices cannot be received, processed and stored in the backstage server. Once these devices are not imported or input to the backstage server, the data cannot be normally uploaded or processed, leading to data loss or delayed reception.

The process of maintaining device information also requires that a serial number of a device itself, information on an organization corresponding to the device and the like are obtained and then imported by electronic sheets or input by code scanning to a backstage server. Due to manual operation of the process, the process is time and labor-consuming and easily generates errors. In a case of replacement of devices, it is also required to maintain device information firstly in the server and then provide the devices in a house, so as to ensure device data can be normally uploaded to the backstage. Therefore, plug-and-play effect cannot be achieved. Moreover, those old devices shall not be deleted here when replacing devices, leading to confusion in management.

In view of this, some embodiments of the present disclosure provide a device registration method. Please refer to FIG. 1 which shows a flowchart of the device registration method. The method includes steps S101 to S103.

Figure 1:
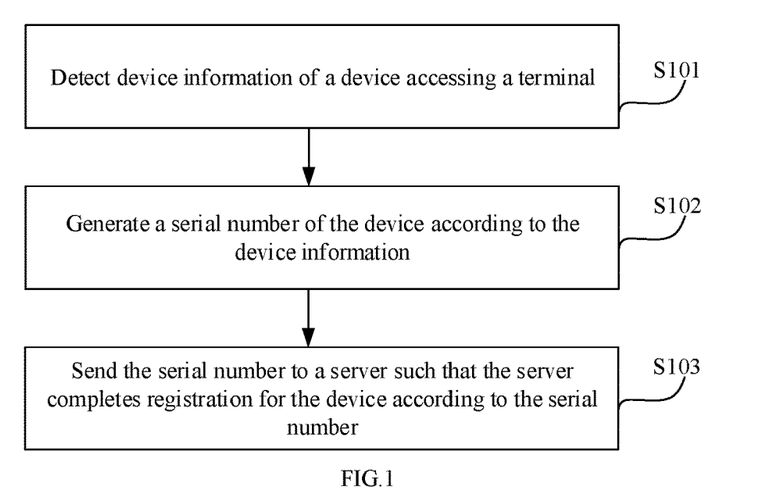
FIG. 1 is a flowchart illustrating a device registration method according to some embodiments of the present disclosure.

The device registration method may be used to register a detection device in a health detection platform such as a healthhouse to a backstage server. That is, the detection device is enabled to become a legitimate device recorded in the backstage server, such that the detection device can normally send health data to the backstage server. The backstage server can receive, process and store health data from the legitimate device. Therefore, the method may be performed by a terminal in a workroom such as a healthhouse.

In an application scenario of a healthhouse, at least one work station and at least one type of detection devices are disposed in the house and each type of detection devices may include a plurality of devices. A user may log into the work station and input user information. The user may select a device to be used through the work station, and the work station may perform detection guidance to the user in the form of user interaction interface, etc. The user may, according to the detection guidance provided by the work station, move to the position of the corresponding detection device for corresponding detection. After the user is detected by the detection device, the corresponding detection result will be sent to the work station for displaying. The healthhouse may be disposed in a place such as a community and thus residents in the community may go into the house to perform health detection by a device, thereby facilitating the residents to perform health self-management.

At step S101, device information of a device accessing a terminal is detected.

The terminal may be a terminal in a workroom such as a healthhouse. In some embodiments, the workroom may be the above healthhouse and the terminal is a work station disposed in the healthhouse. The workroom may also be other spaces such as an exhibition hall, which is not limited herein.

The terminal in the workroom has a large number of serial interfaces and/or Universal Serial Bus (USB) interfaces, and the device such as a detection device may access the terminal through these serial interfaces and/or USB interfaces.

The device may be a medical detection device which is a device capable of detecting human body health indexes, and may be a household device or a medical device, which is not limited herein. The device information may include at least one of a device type, a type identifier, a device model, a name, a vendor, and a serial port address. The device types are divided based on category of detection devices, for example, the device type may be a blood pressure monitor, a height and weight measurement instrument and the like.

The type identifier is an identifier of the device type, for example, may be a number corresponding to the above device type and the like. For example, the type identifier of the blood pressure monitor is 1, and the type identifier of the height and weight measurement instrument is 2. The specific type identifier may be preset correspondingly, which is not limited herein.

The terminal may detect the device information of the accessing device in many manners, for example, the terminal may actively read the device information of the device through accessing serial interface or USB interface or the accessing device reports the device information through a serial interface or a USB interface. In a feasible implementation, the device accessing the terminal may be detected by use of a Software Development Kit (SDK) disposed in the terminal to obtain the device information of the device. In a feasible implementation, the device accessing the terminal may be detected by use of a configuration file disposed in the terminal to obtain the device information of the device.

At step S102, a serial number of the device is generated according to the device information.

The serial number of the device is a unique identifier of the device in the backstage server and may include information of one or more aspects of the device to distinguish the device from other devices. The serial number may have a specific format to facilitate comparison of the serial numbers of different devices and help the server to analyze the serial number to locate the device. The format of the serial number may be generated by the server or the terminal by default, or may be preset by a user. For example, the serial number may include a terminal identifier and a device model as shown in "ws-m0", where "ws" refers to a terminal identifier and "m0" refers to a device model. For another example, the serial number may include a workroom identifier, a terminal identifier, a type identifier and a device model as shown in the serial number "ws-mtx-m0-3", where "ws" refers to a terminal identifier, "mtx" refers to a type identifier of the device type, "m0" refers to a device model, and "3" refers to a workroom identifier. The workroom identifier may be an identifier of a healthhouse, for example, a number or a name, and the terminal identifier may also be a number or a name.

The serial number of the device may be generated according to the device information in the following manner: firstly, at least one piece of information is obtained from the device information, and then, the serial number of the device is generated according to the at least one piece of information and a preset format of the serial number.

When obtaining at least one piece of information contained in the serial number from the device information, information desired by the serial number may be firstly read for specific obtaining. For example, when the serial number includes a type identifier and a device model, the type identifier and the device model may be obtained from the device information. When generating the serial number of the device, at least one piece of information obtained from the device information may be sorted based on a preset order and connected by use of preset connectors and then necessary labeling characters are added.

Furthermore, when the serial number also includes a terminal identifier, the terminal identifier may be obtained and the serial number of the device is generated according to the terminal identifier, the at least one piece of information and the preset format of the serial number. For example, the serial number is generated by arranging the terminal identifier and the device model in a preset format. When the serial number further includes a workroom identifier and a terminal identifier, the workroom identifier and the terminal identifier may be obtained, and the serial number of the device is generated according to the workroom identifier, the terminal identifier, the at least one piece of information and the preset format of the serial number. The workroom identifier may be a name and/or a number, and the terminal identifier may also be a name and/or a number. When the serial number includes a terminal identifier, or includes a workroom identifier and a terminal identifier, it is also required to sort the terminal identifier and the at least one piece of information obtained from the device information in a preset order and connect them by use of preset connectors and then add necessary labeling characters, or sort the workroom identifier, the terminal identifier and the at least one piece of information obtained from the device information in a preset order, connect them by use of preset connectors and then add necessary labeling characters.

In some embodiments, when there are a plurality of different workrooms, the different workrooms may be disposed in different regions, for example, in different cities. Unique workroom identifiers may be assigned to the different workrooms and the workroom identifier may include a workroom name and/or a workroom number ID. The workroom identifier (e.g. the identifier of the healthhouse) is obtained based on information of a user when the user logs into a terminal (e.g. work station), and may include a workroom name and a workroom number ID (e.g. the name of the healthhouse and the unique identifier ID of the healthhouse). In some embodiments, the information of the healthhouse and the device information are taken as input parameters to associate the device with the healthhouse and the device in the input parameters belong to the house in the input parameters.

At step S103, the serial number is sent to a server such that the server completes registration for the device according to the serial number.

For example, after receiving the serial number, the server marks the device as a registered device according to the serial number.

For example, when the serial number includes a workroom identifier, the server may, after receiving the serial number, verify legitimacy of the workroom based on the workroom identifier and verify the legitimacy of the device based on the device information; and in response to that the workroom is legitimate and the device is legitimate, bind the device and the workroom and mark the device as a registered device.

In addition, after the server completes registration for the device, the detection data of the device can be normally reported. That is, the terminal may receive data generated by the registered device and send the data to the server, such that the server processes and/or stores the data. When registering the device, the server may preset a dedicated storage region for the device. When the detection data uploaded by the device is stored, the data may be stored in a corresponding storage region. However, when reporting data, the terminal may label the data using the serial number of the device such that the server can determine a device to which the data belongs.

In an embodiment of the present disclosure, a terminal may detect device information of a device accessing the terminal and generate a serial number of the device according to the device information and finally send the above serial number to a server such that the server completes registration for the device according to the serial number. In this way, it is avoided that the device information is imported or input to the backstage server, thus saving labor costs and improving registration efficiency. In this case, the device can be used once accessing and the case that data of the accessing device cannot be uploaded is avoided. Moreover, the automatically-generated serial number does not need the serial number of the device itself, avoiding the dirty data problem resulting from exposure of the serial number of the device. In addition, free device allocation and replacement between different workrooms can be achieved without adding and changing a corresponding device attribute in the backstage server. At the same time, no dirty data of the device allocation historical record of the faulty devices is generated.

In some embodiments of the present disclosure, a configuration file may be pre-stored in a terminal. The configuration file includes device information of each device to access the terminal, and the device information includes a device model and at least one piece of device attribute information. The device attribute information includes at least one of a type identifier, a device type, a device name, a vendor and a serial port address.

Based on this, the device information of the device accessing the terminal may be detected in the following manner: firstly, the device accessing the terminal is detected by use of a software development kit disposed in the terminal to obtain a device model of the device; next, according to the device model, the at least one piece of device attribute information corresponding to the device model is obtained from the configuration file. For example, the device model of the device is found from the configuration file and thus the device attribute information of the device corresponding to the device model may be obtained.

Since the device information of the device is pre-written into the configuration file and the device model is a unique identifier of the device information (because the terminal will not access a plurality of devices of same model), all device information can be determined by only obtaining the device model of the device, thereby greatly improving the efficiency and the accuracy. The configuration file and the accessing device are consistent because they are determined based on the working property of the terminal. For example, the terminal needs to have the functions of blood pressure measurement, height and weight measurement and body fat measurement and therefore after three specific devices are selected, the device information is written into the configuration file and then the three devices are connected to the terminal.

In some embodiments of the present disclosure, the device information of the device accessing the terminal may also be detected in the following manner:

a configuration file is pre-stored in the terminal where the configuration file includes device information of each device to access the terminal and a serial port scan command;

a matched device and device information of the device are obtained by comparing the device information in the configuration file with the device;

whether the matched device is connected is confirmed by use of the serial port scan command in the configuration file;

when it is confirmed that the matched device is connected, the device information of the matched device is determined as the device information of the device accessing the terminal.

For example, after the device accesses the terminal, the terminal compares at least one piece of device information pre-stored in the configuration file with the accessing device, for example, compares the device model, the device type, the vendor, etc., with the device one by one. In a case of successful matching, the device information of the device is obtained. Next, whether the device is in a connected state is to be confirmed. For example, the serial port scan command includes a sending command and a standard reception command. After the device information is obtained, the sending command is sent to the device and the device may return one reception command to the terminal. The terminal may compare the reception command with the standard reception command and then confirm the device is connected in a case of successful matching. At this time, the device information obtained by matching is taken as the device information of the detected device accessing the terminal.

In addition, when it is to replace the device accessing the terminal, the device information of at least one device may be added, deleted or updated according to specific replacement information, and then the corresponding device is connected, or removed or replaced. When a new device is to be added, the device information of the selected device may be firstly added to the configuration file and then the device is connected. When a device is to be removed, the device information of the device in the configuration file may be deleted before removal. The step does not affect the removal of the device but reduces the memory of the configuration file. When a device is to be replaced, the device information of the original device may be updated to the device information of a new device and then the original device is removed and the new device is connected. Through advance operations for the configuration file, replacement of device may be achieved at any time to achieve the plug- and-play effect. Furthermore, the device information is updated only in the terminal locally, and the backstage server updates the device information tacitly, thus reducing the problems of information asymmetry resulting from performing direct modification in the server.

In some embodiments of the present disclosure, at least one of the workroom identifier, the device type, the type identifier, the name, the vendor and the serial port address may be sent to the server at the time of sending the serial number to the server, such that the server completes registration for the device.

The workroom identifier is directly sent to the server such that the server can determine legitimacy of a workroom based on the workroom identifier before analyzing the serial number, thereby improving the registration efficiency. When the workroom is illegitimate, it is not necessary to analyze the serial number. Sending the device information in addition to the device model (i.e. at least one of a device type, a type identifier, a name, a vendor and a serial port address) to the server may further increase the registered device information to enable the registration information to be richer○ Further, these device information may be displayed.

For example, information sent by the terminal to the server is {"sn":"ws-mtx-m0-3","deviceName":"non-invasive blood tester","model":"m0","vendor":"BOE" "sceneId":"3"}, where sn is a serial number generated automatically by the terminal, deviceName is a device name, model is a device model, vendor is a device vendor, and sceneId is a workroom number.

Some embodiments of the present disclosure provide a device registration method. Please refer to FIG. 2, which shows a flowchart of the device registration method. The method includes steps S201 to S202.

Figure 2:
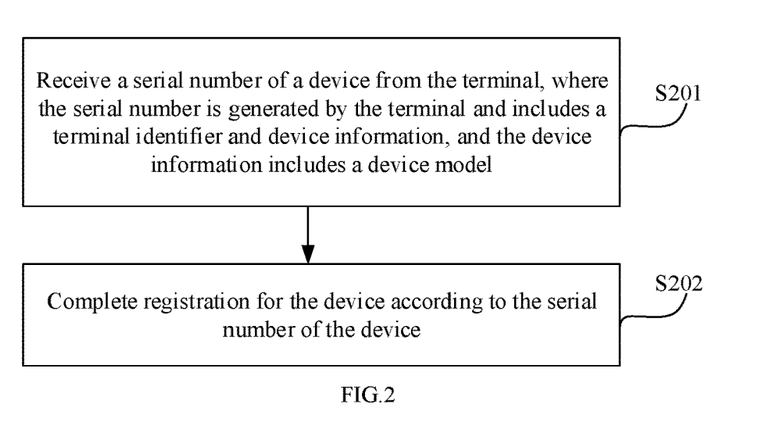
FIG. 2 is a flowchart illustrating a device registration method according to some other embodiments of the present disclosure.

The device registration method may be applied to a server, i.e. a backstage server which communicates with a terminal in a workroom through network.

At step S201, a serial number of a device is received from the terminal, where the serial number is generated by the terminal and includes a terminal identifier and device information, and the device information includes a device model.

The process in which the terminal generates the serial number is already detailed in the other embodiments and will not be repeated herein. It is to be noted that the terminal may send at least one of a workroom identifier, a device type, a type identifier, a name, a vendor and a serial port address at the time of sending the serial number and at this time, the server may receive these information together.

At step S202, registration for the device is completed according to the serial number of the device.

The server may firstly verify legitimacy of the workroom based on the workroom identifier and verify legitimacy of the device based on the device information; and in response to that the workroom is legitimate and the device is legitimate, bind the device and the workroom and mark the device as a registered device.

A legitimate workroom list may be pre-stored in the server. When verifying the legitimacy of a workroom, the server may compare the workroom identifier with each identifier in the list. The server may determine the workroom is legitimate if the workroom identifier is present in the list, and determine the workroom is illegitimate if the workroom identifier is not present in the list. A legitimate device type list may be pre-stored in the server. When verifying legitimacy of the device, the server may compare the device type with each type in the list. The server may determine the device is legitimate if the device type is present in the list, and determine the device is illegitimate if the device type is not present in the list.

In addition, before the device and the workroom are bound and the device is marked as a registered device, it may also be determined whether the serial number of the device is a serial number of a registered device. If the serial number of the device is the serial number of the registered device, the device information of the registered device is updated. If the serial number of the device is not the serial number of a registered device, the device and the workroom are bound and the device is marked as a registered device. Through the above steps, duplicate registration can be avoided to prevent wrong and disorderly device information.

In this embodiment, only when the device in the workroom is actually connected can the obtaining of the device information, the generation of the serial number and the reverse registration can be performed. Further, the device may be put into the workroom and used at any time without requiring pre-processing operation and procedure to be performed in the backstage. In this case, the conventional backstage input operation is changed into active registration operation at the time of on-site device connection, eliminating the error rate of manual operations, shielding the blocking points of initialization and use process, improving smoothness of the entire flow and the security of the device information.

Figure 3:
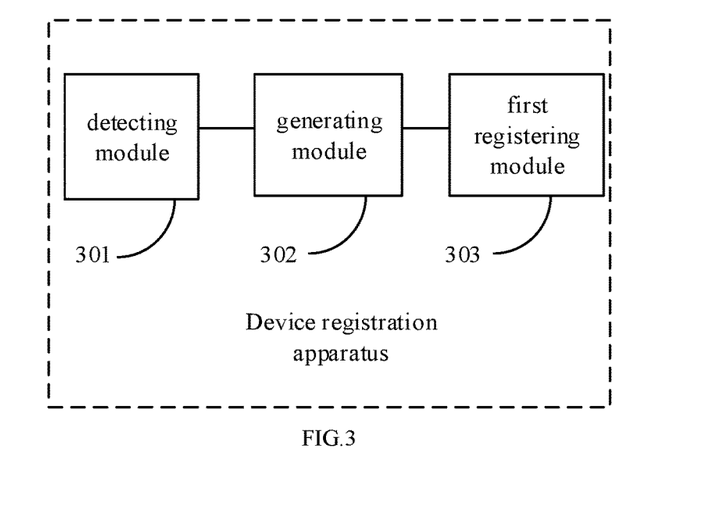
FIG. 3 is a structural schematic diagram illustrating a device registration apparatus according to some embodiments of the present disclosure.

According to some embodiments of the present disclosure, there is provided a device registration apparatus, which may be applied to a terminal in a workroom. Please refer to FIG. 3, which shows a structure of the apparatus. The apparatus includes:

a detecting module 301, configured to detect device information of a device accessing the terminal;

a generating module 302, configured to generate a serial number of the device according to the device information;

a first registering module 303, configured to send the serial number to a server such that the server completes registration for the device according to the serial number.

Figure 4:
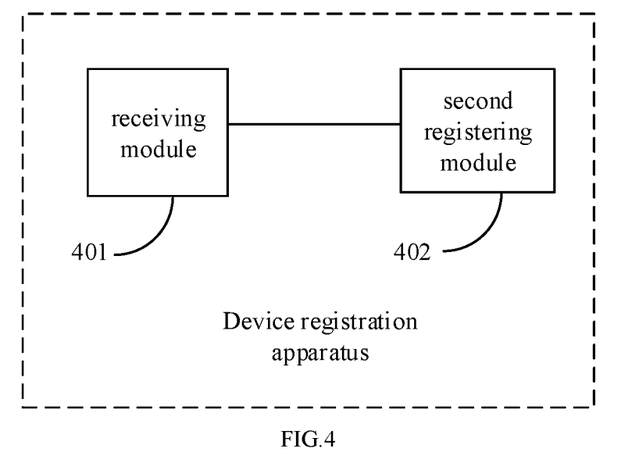
FIG. 4 is a structural schematic diagram illustrating a device registration apparatus according to some other embodiments of the present disclosure.

According to some embodiments of the present disclosure, there is provided a device registration apparatus which may be applied to a server. Please refer to FIG. 4, which shows a structure of the apparatus. The apparatus includes:

a receiving module 401, configured to receive a serial number of a device from a terminal, where the serial number is generated by the terminal and includes a workroom identifier, a terminal identifier and device information, and the device information includes a type identifier and a device model;

a second registering module 402, configured to complete registration for the device according to the serial number of the device.

For the apparatus in the above embodiment, the specific manner in which each module and network perform operations has been detailed in the relevant method embodiments and will not be described in detail herein.

Figure 5:
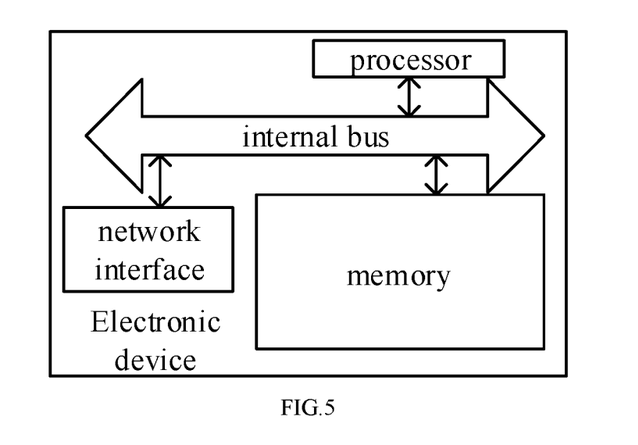
FIG. 5 is a structural schematic diagram illustrating an electronic device according to some embodiments of the present disclosure.

With reference to FIG. 5, some embodiments of the present disclosure provide an electronic device. The device includes a memory and a processor. The memory is configured to store computer instructions executable on the processor and the processor is configured to implement the above method to register a device when executing the computer instructions.

Some embodiments of the present disclosure provide a computer readable storage medium storing computer programs thereon, where the programs are executed by a processor to implement the above method.

Each component embodiment of the present disclosure may be implemented by hardware or by software modules run on one or more processors or by a combination thereof.

It should be understood that various steps of the present disclosure are not necessarily performed in a sequence. Unless otherwise clearly stated in the present disclosure, these steps are not limited to any strict sequence and may be performed in another sequence. Furthermore, at least part of the steps in the flowchart of the accompanying drawings may include a plurality of sub-steps or a plurality of stages. These sub-steps or stages are not necessarily completed at a same moment but may be performed at different moments. These sub-steps or stages are also not necessarily performed in sequence but may be performed in turns or alternately with at least part of other steps or the sub-steps or stages of other steps.

In the present disclosure, the terms "first" and "second" are used for the purpose of descriptions only and shall not be understood as indicating or implying any relative importance. The term "plurality" refers to two or more unless otherwise clearly indicated.

Other implementations of the present disclosure will be apparent to those skilled in the art from consideration of the specification and practice of the present disclosure herein. The present disclosure is intended to cover any variations, uses, modification or adaptations of the present disclosure that follow the general principles of the present disclosure and include common knowledge or conventional technical means in the related art that are not disclosed in the present disclosure. The specification and embodiments are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A device registration method, comprising:
   detecting device information of a device accessing a terminal;
   generating a serial number of the device according to the device information;
   sending the serial number to a server such that the server completes registration for the device according to the serial number;
   wherein the terminal pre-stores a configuration file, and the configuration file comprises device information of each device to access the terminal and a serial port scan command;
   wherein detecting the device information of the device accessing the terminal comprises:
      obtaining a matched device and device information of the matched device by comparing the device information in the configuration file with the device;
      confirming whether the matched device is connected based on the serial port scan command in the configuration file;
      when it is confirmed that the matched device is connected, determining the device information of the matched device as the device information of the device accessing the terminal.

2. The device registration method of claim 1, wherein detecting the device information of the device accessing the terminal comprises:
   detecting the device accessing the terminal by using a software development kit disposed in the terminal to obtain the device information of the device.

3. The device registration method of claim 2, wherein the configuration file comprises the device information of each device to access the terminal, and the device information in the configuration file comprises a device model and at least one piece of device attribute information;
   wherein detecting the device information of the device accessing the terminal comprises:
      detecting the device accessing the terminal by using the software development kit disposed in the terminal to obtain the device model of the device;
      obtaining the at least one piece of device attribute information corresponding to the device model from the configuration file according to the device model.

4. The device registration method of claim 3, wherein the device attribute information comprises a type identifier, a device type, a device name, a vendor, a serial port address, or any combinations thereof.

5. The device registration method of claim 3, further comprising:
   adding, deleting or updating the device information of at least one device in the configuration file.

6. The device registration method of claim 1, wherein the device information comprises a device type, a type identifier, a device model, a device name, a vendor, a serial port address, or any combinations thereof.

7. The device registration method of claim 1, wherein the serial number comprises a terminal identifier and a device model.

8. The device registration method of claim 1, further comprising:
   sending a workroom identifier, a device type, a type identifier, a device name, a vendor a serial port address, or any combinations thereof to the server at the time of sending the serial number to the server, such that the server completes registration for the device.

9. The device registration method of claim 1, wherein after sending the serial number to the server such that the server completes registration for the device according to the serial number, further comprising:
receiving data generated by the registered device, and sending the data to the server such that the server processes and/or stores the data.

10. The device registration method of claim 1, wherein the terminal is a terminal disposed in a healthhouse, and the workroom identifier is an identifier of the healthhouse.

11. An electronic device, wherein the device comprises a memory and a processor; the memory is configured to store computer instructions executable on the processor and the processor is configured to implement the device registration method according to claim 1 when executing the computer instructions.

12. A non-transitory computer readable storage medium storing computer programs thereon, wherein the programs are executed by a processor to implement the method according to claim 1.

13. A device registration method, comprising:
detecting device information of a device accessing a terminal;
generating a serial number of the device according to the device information;
sending the serial number to a server such that the server completes registration for the device according to the serial number;
wherein generating the serial number of the device according to the device information comprises:
obtaining at least one piece of information from the device information;
generating the serial number of the device according to the at least one piece of information and a preset format of the serial number.

14. The device registration method of claim 13, further comprising:
obtaining a terminal identifier, and generating the serial number of the device according to the terminal identifier, the at least one piece of information and the preset format of the serial number.

15. The device registration method of claim 13, further comprising:
obtaining a workroom identifier and a terminal identifier, and generating the serial number of the device according to the workroom identifier, the terminal identifier, the at least one piece of information and the preset format of the serial number.

16. A device registration method, comprising:
receiving a serial number of a device from a terminal, wherein the serial number is generated by the terminal and comprises a terminal identifier and device information, and the device information comprises a device model;
completing registration for the device according to the serial number of the device;
the method further comprises:
receiving a workroom identifier, a device type, a type identifier, a name, a vendor, a serial port address or any combinations thereof from the terminal;
wherein completing registration for the device according to the serial number of the device comprises:
verifying legitimacy of the workroom based on the workroom identifier, and verifying legitimacy of the device based on the device information;
in response to that the workroom is legitimate and the device is legitimate, binding the device and the workroom, and marking the device as a registered device.

17. An electronic device, wherein the device comprises a memory and a processor; the memory is configured to store computer instructions executable on the processor and the processor is configured to implement the device registration method according to claim 16 when executing the computer instructions.

18. A non-transitory computer readable storage medium storing computer programs thereon, wherein the programs are executed by a processor to implement the method according to claim 16.

19. The device registration method of claim 16, wherein before the device and the workroom are bound and the device is marked as the registered device,
determining whether the serial number of the device is a serial number of a registered device;
if the serial number of the device is not a serial number of a registered device, the device and the workroom are bound and the device is marked registered.

20. The device registration method of claim 19, wherein if the serial number of the device is a serial number of a registered device, the device information of the registered device is updated.

* * * * *